US012614911B2

(12) United States Patent
Kuwahara et al.

(10) Patent No.: US 12,614,911 B2
(45) Date of Patent: Apr. 28, 2026

(54) CHARGING SYSTEM

(71) Applicant: TOYOTA JIDOSHA KABUSHIKI KAISHA, Toyota (JP)

(72) Inventors: Koichi Kuwahara, Nagoya (JP);
Takashi Kohyama, Toyota (JP);
Keisuke Sawazaki, Nisshin (JP);
Ikuhiro Nakamura, Nisshin (JP);
Toshio Ikeyama, Toyota (JP); **Takuya
Isomura, Aichi-ken (JP); Tatsuya
Furukawa, Toyota (JP); Yohichi
Murasawa**, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/964,678

(22) Filed: Dec. 2, 2024

(65) Prior Publication Data

US 2025/0219437 A1     Jul. 3, 2025

(30) Foreign Application Priority Data

Dec. 27, 2023     (JP) ................................ 2023-221046

(51) Int. Cl.
*H02J 7/24*          (2006.01)
*H02P 27/06*         (2006.01)
*H02K 11/33*         (2016.01)
(52) U.S. Cl.
CPC .............. *H02J 7/243* (2020.01); *H02P 27/06*
(2013.01); *H02J 2207/20* (2020.01); *H02K
11/33* (2016.01)

(58) Field of Classification Search
CPC .......... H02J 7/243; H02J 2207/20; H02J 7/00;
H02J 7/14; H02P 27/06; H02K 11/33;
(Continued)

(56) References Cited

U.S. PATENT DOCUMENTS 5,952,812 A * 9/1999 Maeda ...................... H02J 7/02
318/803
8,901,882 B2 * 12/2014 Song ...................... B60L 53/22
320/109
(Continued)

FOREIGN PATENT DOCUMENTS

JP          6907171 B2     7/2021
JP      2023-114972 A      8/2023

*Primary Examiner* — Daniel Kessie
*Assistant Examiner* — Brian K Baxter
(74) *Attorney, Agent, or Firm* — SoraIP, Inc.

(57)          ABSTRACT
A charging system includes a motor, first/second inverters, a neutral point switching element, a power receiving terminal, a circuit selector, and a controller. The motor includes a plurality of stator coils. First ends of the stator coils are connected to the first inverter, and second ends of the stator coils are connected to the second inverter. The neutral point switching elements interconnect the second ends of the stator coils at neutral points. An external power source is connected to the power receiving terminal. The circuit selector switches a connection relationship between the first/second inverters, the power receiving terminal, and the neutral point. The controller controls the circuit selector so that a current flows from the external power source to the stator coil through the switching element having a small accumulated stress among the switching elements of the first/second inverters and the neutral point switching element.

1 Claim, 4 Drawing Sheets

(58) Field of Classification Search
   CPC ........ B60L 53/22; B60L 15/007; H02M 1/08;
                                                    H02M 7/48
   See application file for complete search history.

(56)                      References Cited

U.S. PATENT DOCUMENTS

| | | | |
|---|---|---|---|
| 11,757,298 B2 * | 9/2023 | Bae | B60L 53/24 |
| | | | 320/155 |
| 11,855,543 B2 * | 12/2023 | Teng | H02M 3/33584 |
| 2013/0147431 A1 * | 6/2013 | Lim | H02J 7/02 |
| | | | 320/109 |
| 2015/0343904 A1 * | 12/2015 | Ikeyama | B60L 3/0007 |
| | | | 903/907 |
| 2017/0246958 A1 * | 8/2017 | Song | B60L 50/60 |
| 2018/0281605 A1 * | 10/2018 | Sawazaki | H01L 23/473 |
| 2019/0152331 A1 * | 5/2019 | Sawazaki | B60K 6/40 |
| 2020/0313581 A1 * | 10/2020 | Chon | B60L 50/61 |
| 2020/0361323 A1 * | 11/2020 | Chon | H02M 7/44 |
| 2021/0061118 A1 * | 3/2021 | Lee | H02J 7/1492 |
| 2021/0211084 A1 | 7/2021 | Kinjo et al. | |
| 2022/0194239 A1 * | 6/2022 | Zhu | H02M 1/4225 |
| 2022/0294464 A1 * | 9/2022 | Asakawa | H02P 6/16 |
| 2022/0302866 A1 * | 9/2022 | Hayashi | H02J 3/322 |
| 2022/0324340 A1 * | 10/2022 | Haghbin | B60L 53/24 |
| 2022/0410741 A1 * | 12/2022 | Jeong | H02M 7/5395 |
| 2023/0226936 A1 * | 7/2023 | Haghbin | B60L 53/16 |
| | | | 701/22 |
| 2023/0249566 A1 * | 8/2023 | Kim | B60L 50/60 |
| | | | 320/109 |
| 2024/0348081 A1 * | 10/2024 | Zhu | B60L 15/007 |
| 2025/0010739 A1 * | 1/2025 | Saha | H02J 7/02 |
| 2025/0010740 A1 * | 1/2025 | Saha | H02P 27/06 |
| 2025/0038675 A1 * | 1/2025 | Saha | B60L 53/14 |
| 2025/0112577 A1 * | 4/2025 | Alam | H02M 1/4233 |
| 2025/0183833 A1 * | 6/2025 | Peng | B60L 53/24 |

* cited by examiner

FIRST CHARGING MODE

FIG. 3

SECOND CHARGING MODE

FIG. 4

NEUTRAL POINT CHARGING MODE

CHARGING SYSTEM

CROSS-REFERENCE TO RELATED APPLICATION

This application claims priority to Japanese Patent Application No. 2023-221046 filed on Dec. 27, 2023, incorporated herein by reference in its entirety.

BACKGROUND

1. Technical Field

The technology disclosed by the present specification relates to a charging system that charges a battery by using a stator coil of a motor and a switching element of an inverter as a boost converter.

2. Description of Related Art

It is known that a stator coil of a motor and a circuit of a switching element of an inverter can be used as a boost converter. Japanese Unexamined Patent Application Publication No. 2023-114972 (JP 2023-114972 A) discloses a device that charges a battery by an external power source with an output voltage lower than an output voltage of the battery by using a stator coil of a motor and a switching element of an inverter as a boost converter. In the technology of JP 2023-114972 A, the battery is charged by using a dual-inverter type drive device using one motor and two inverters. In the dual-inverter type drive device, an open-winding type motor is used. A first end of the stator coil of the motor is connected to a first inverter, and a second end of the stator coil of the motor is connected to a second inverter.

In the dual-inverter type drive device, if the other end of a plurality of stator coils is interconnected at a neutral point, the dual-inverter type drive device can be used as a normally-closed type motor drive device. In the device of JP 2023-114972 A, the second end of each of the stator coils is interconnected at the neutral point, and the external power source is connected to the neutral point. The current of the external power source flows to each of the stator coils through the neutral point. By turning ON/OFF a lower switching element of the first inverter, the voltage of the external power source is boosted by the stator coils. Power of the external power source flows to the battery through the neutral point/the stator coil/an upper switching element of the first inverter. In the description, for convenience of explanation, a charging method that sends power to the battery through the neutral point will be called neutral point charging.

SUMMARY

If neutral point charging is repeated, an accumulated stress (accumulated load) of a neutral point switching element that connects the second end of each of the stator coils to the neutral point increases. The present specification provides technology that alleviates an accumulated stress of a neutral point switching element, in a charging system using a dual-inverter type driving device.

The Charging System Disclosed by the Present Specification Includes
   a motor,
   a first inverter and a second inverter, a neutral point switching element, a power receiving terminal,
   a circuit selector, and
   a controller.

The motor includes a plurality of stator coils. First ends of the stator coils are connected to the first inverter, and second ends of the stator coils are connected to the second inverter. When the neutral point switching element is turned ON, the second end of each of the stator coils is interconnected at a neutral point. The power receiving terminal includes a connection positive electrode end and a connection negative electrode end, and can connect an external power source with an output voltage lower than an output voltage of the battery. The circuit selector switches a connection relationship between the first inventor, the second inverter, the power receiving terminal, and the neutral point.

The first inverter includes a plurality of first series connectors connected in parallel between a battery positive electrode end and a first ground end.
Each of the first series connectors includes a first upper switching element and a first lower switching element connected in series.
The first end of each of the stator coils is connected to a center point (a connection point between the first upper switching element and the first lower switching element) of each of the first series connectors.
The second inverter includes a plurality of second series connectors connected in parallel between the battery positive electrode end and a second ground end. Each of the second series connectors includes a second upper switching element and a second lower switching element connected in series.
The second end of each of the stator coils is connected to a center point (a connection point between the second upper switching element and the second lower switching element) of each of the second series connectors.

Any one of following modes is selectable in the circuit selector: a motor driving mode; a first charging mode; a second charging mode; and a neutral point charging mode.
In the motor driving mode, the first ground end and the second ground end are connected to a battery negative electrode. The motor driving mode is selected when the motor is driven.
In the first charging mode, the first ground end is connected to the battery negative electrode, and the second ground end is connected to the connection positive electrode end by disconnecting from the battery negative electrode.
In the second charging mode, the second ground end is connected to the battery negative electrode, and the first ground end is connected to the connection positive electrode end by disconnecting from the battery negative electrode.
In the neutral point charging mode, the neutral point is connected to the connection positive electrode end, and the first ground end is connected to the battery negative electrode.

When the motor is driven by the first inverter and the second inverter, the controller sets the selector to the motor driving mode, and holds the neutral point switching element to OFF.
If the controller appropriately controls the first inverter and the second inverter, the motor is driven.
When the motor is driven by only the first inverter, the controller sets the selector to the motor driving mode, and holds the neutral point switching element to ON. If the controller stops the second inverter and controls the first inverter, the motor is driven by AC power sent from the first inverter.

When the external power source is connected to the power receiving terminal, the controller executes the following processes. The controller compares an accumulated stress (first accumulated stress) of the first lower switching element, an accumulated stress (second accumulated stress) of the second lower switching element, and an accumulated stress (third accumulated stress) of the neutral point switching element. When the second accumulated stress is smallest, the controller holds the neutral point switching element to OFF, sets the circuit selector to the first charging mode, and appropriately turns the first lower switching element ON and OFF. The voltage of the external power source is boosted by an operation of the first lower switching element, and the battery is charged.

When the first accumulated stress is smallest, the controller holds the neutral point switching element to OFF, sets the circuit selector to the second charging mode, and appropriately turns the second lower switching element ON and OFF. The voltage of the external power source is boosted by an operation of the second lower switching element, and the battery is charged. When the third accumulated stress is smallest, the controller holds the neutral point switching element to ON, sets the circuit selector to the neutral point charging mode, and appropriately turns the first lower switching element ON and OFF. The voltage of the external power source is boosted by an operation of the first lower switching element, and the battery is charged.

In the neutral point charging mode, the current of the external power source flows to each of the stator coils through the neutral point switching element. However, in the first charging mode, the current of the external power source bypasses the neutral point switching element, and flows to each of the stator coils through the second lower switching element. In the second charging mode, the current of the external power source bypasses the neutral point switching element, and flows to each of the stator coils through the first lower switching element.

In the charging system disclosed by the present specification, the current of the external power source flows to each of the stator coils through the element with a smallest accumulated stress from among the neutral point switching element, the first lower switching element, and the second lower switching element. Therefore, the load of the neutral point switching element is alleviated.

Note that, an accumulated stress is calculated based on an accumulated value of a temperature rise per unit time of the switching element. Details of the technique disclosed in the present specification and further modifications will be described in the "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a circuit diagram of a charging system according to an embodiment;

FIG. 2 is a circuit diagram showing the current flow in the first charging mode;

FIG. 3 is a schematic diagram showing the current flow in the second charging mode; and FIG. 4 is a circuit diagram showing the current flow in the neutral point charging mode.

DETAILED DESCRIPTION OF EMBODIMENTS

Figure 1:
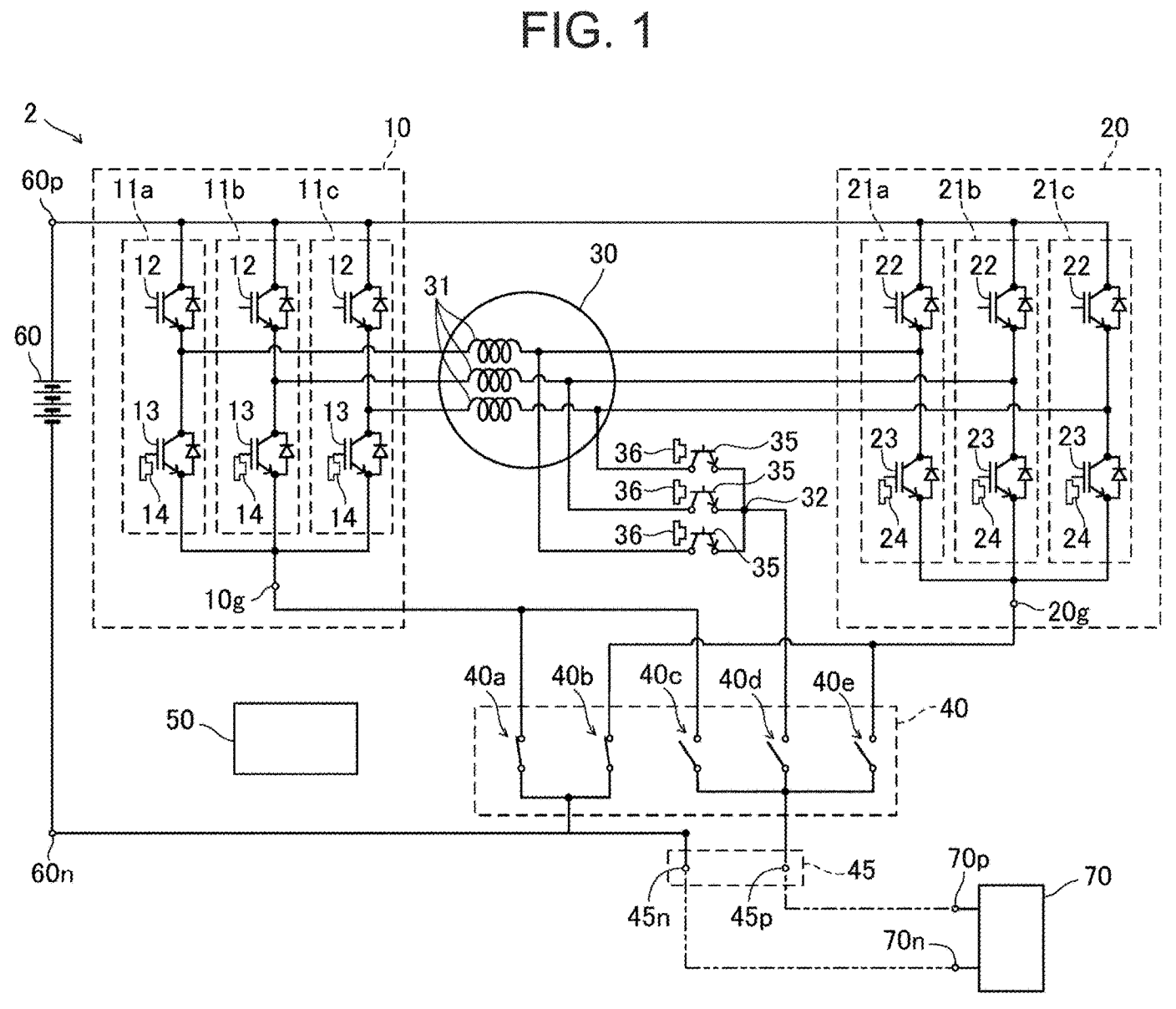

A charging system 2 according to an embodiment will be described with reference to the drawings. FIG. 1 shows a circuit diagram of a charging system 2. The charging system 2 includes a first inverter 10, a second inverter 20, a motor 30, a neutral point switching element 35, a circuit selector 40, a power receiving terminal 45, and a controller 50. In addition to the charging system 2, a battery 60 and an external power source 70 are illustrated in FIG. 1.

The charging system 2 can charge the battery 60 with an external power source 70 connected to the power receiving terminal 45. When the battery 60 is charged, the lower switching element of the first inverter 10 or the second inverter 20 and the stator coil 31 of the motor 30 function as a boost converter. Therefore, the battery 60 can be charged by the external power source 70 having an output voltage lower than that of the battery 60.

The charging system 2 and the battery 60 are mounted on a battery electric vehicle. The motor 30 is coupled to an axle (not shown) of battery electric vehicle. The charging system 2 also functions as a drive system that drives the motor 30 with the electric power of the battery 60 to drive battery electric vehicle. The motor 30 is a three-phase AC motor and includes a plurality of stator coils 31.

The configuration of the first inverter 10 will be described. The first inverter 10 has a first ground end 10g and three sets of first series connectors 11a, 11b, 11c. Three sets of first series connectors 11a, 11b, 11c are connected in parallel between the positive terminal (battery positive electrode end 60p) of the battery 60 and the first ground end 10g.

Each of the three sets of first series connector 11a, 11b, 11c includes a first upper switching element 12 and a first lower switching element 13 connected in series. The first upper switching element 12 is connected to the battery positive electrode end 60p, and the first lower switching element 13 is connected to the first ground end 10g. A first end of each of the three stator coils 31 is connected to a center point (a connecting point between the first upper switching element 12 and the first lower switching element 13) of each of the three sets of first series connectors 11a, 11b, 11c. The first inverter 10 includes a plurality of temperature sensors 14, and each temperature sensor 14 measures the temperature of each of the plurality of first lower switching elements 13.

The configuration of the second inverter 20 will be described. The second inverters 20 have a second ground end 20g and three sets of second series connectors 21a, 21b, 21c. Three sets of second series connectors 21a, 21b, 21c are connected in parallel between the battery positive electrode end 60p and the second ground end 20g.

Each of the three sets of second series connectors 21a, 21b, 21c includes a second upper switching element 22 and a second lower switching element 23 connected in series. The second upper switching element 22 is connected to the battery positive electrode end 60p, and the second lower switching element 23 is connected to the second ground end 20g. The second end of each of the three stator coils 31 is connected to the center point (the connecting point of the second upper switching element 22 and the second lower switching element 23) of each of the three sets of second series connectors 21a, 21b, 21c. The second inverter 20 includes a plurality of temperature sensors 24, and each temperature sensor 24 measures the temperature of each of the plurality of second lower switching elements 23.

A freewheeling diode is connected in anti-parallel to each switching element of the first inverter 10 and the second inverter 20. The freewheeling diode may be a separate element from the switching element, or may be a diode included in the switching element.

The charging system 2 includes a plurality of neutral point switching elements 35. Each of the plurality of neutral point switching elements 35 is disposed between the second end of each of the plurality of stator coils 31 and the neutral point 32. When the plurality of neutral point switching elements 35 are held on, the plurality of stator coils 31 are connected to each other at the neutral point 32. The charging system 2 comprises a plurality of temperature sensors 36, each temperature sensor 36 measuring the temperature of each of the plurality of neutral point switching elements 35.

The power receiving terminal 45 includes a connection positive electrode end 45*p* and a connection negative electrode end 45*n*. An external power source 70 is connected to the power receiving terminal 45. The positive terminal 70*p* of the external power source 70 is connected to the connection positive electrode end 45*p*, and the negative terminal 70*n* of the external power source 70 is connected to the connection negative electrode end 45*n*. The connection negative electrode end 45*n* is connected to the battery negative electrode end 60*n*. The connection positive electrode end 45*p* is connected to any one of the first ground end 10*g*, the second ground end 20*g*, and the neutral point 32 by the circuit selector 40.

The circuit selector 40 will be described. Circuit selector 40 includes five switches 40*a*-40*e*. The switch 40*a* connects the first ground end 10*g* to the battery negative electrode end 60*n* and disconnects the first ground end 10*g* from the battery negative electrode end 60*n*. The switch 40*b* connects the second ground end 20*g* to the battery negative electrode end 60*n* and disconnects the second ground end 20*g* from the battery negative electrode end 60*n*.

The switch 40*c* connects the first ground end 10*g* to the connection positive electrode end 45*p* and disconnects the first ground end 10*g* from the connection positive electrode end 45*p*. The switch 40*d* connects the neutral point 32 to the connection positive electrode end 45*p* or disconnects the neutral point 32 from the connection positive electrode end 45*p*. The switch 40*e* connects the second ground end 20*g* to the connection positive electrode end 45*p* and disconnects the second ground end 20*g* from the connection positive electrode end 45*p*.

The circuit selector 40 (switches 40*a*-40*e*) is controlled by the controllers 50. When the controller 50 appropriately controls the switches 40*a*-40*e* of the circuit selector 40, the connection relationship between the first inverter 10, the second inverter 20, the neutral point 32, and the power receiving terminal 45 is switched. The state of the circuit selector 40 is hereinafter referred to as a "mode". A mode selectable in the circuit selector 40 is as follows.

motor driving mode: Close the switches 40*a* and 40*b* and open the switches 40*c*-40*e*. By closing the switches 40*a* and 40*b*, the first ground end 10*g* and the second ground end 20*g* are connected to the battery negative electrode end 60*n*.

first charging mode: Close the switches 40*a*, 40*e* and open the remaining switches 40*b*, 40*c*, 40*d*. When the switch 40*a* is closed, the first ground end 10*g* is connected to the battery negative electrode end 60*n*. By opening the switch 40*b* and closing the switch 40*e*, the second ground end 20*g* is disconnected from the battery negative electrode end 60*n* and is connected to the connection positive electrode end 45*p*. By opening the switch 40*d*, the neutral point 32 is disconnected from the connection positive electrode end 45*p*.

second charging mode: Close the switches 40*b*, 40*c* and open the remaining switches 40*a*, 40*d*, 40*e*. When the switch 40*b* is closed, the second ground end 20*g* is connected to the battery negative electrode end 60*n*. By opening the switch 40*a* and closing the switch 40*c*, the first ground end 10*g* is disconnected from the battery negative electrode end 60*n* and is connected to the connection positive electrode end 45*p*. Opening the switch 40*d* disconnects the neutral point from the connection positive electrode end 45*p*.

Neutral point charging mode: Close the switches 40*a* and 40*d* and open the remaining switches 40*b*, 40*c*, 40*e*. When the switch 40*a* is closed, the first ground end 10*g* is connected to the battery negative electrode end 60*n*. Closing the switch 40*d* connects the neutral point 32 to the connection positive electrode end 45*p*.

The controller 50 controls the circuit selector 40 and selects one of the four modes. Next, the operation of the controller 50 will be described.

When the motor 30 is driven by both the first inverter 10 and the second inverter 20, the controller 50 holds the neutral point switching element 35 off and sets the circuit selector 40 to the motor driving mode. Holding the switching element off means opening the switching element. At this time, a first end of the plurality of stator coils 31 is connected to the AC terminal of the first inverter 10, and a second end is connected to the AC terminal of the second inverter 20. The motor 30 is an open type motor. When the controller 50 appropriately turns on and off the switching elements of the first inverter 10 and the second inverter 20, the motor 30 is driven. Since the motor 30 is driven by two inverters, a high torque can be output.

In FIG. 1, the switches 40*a*, 40*b* are closed and the remaining switches 40*c*-40*e* are open. That is, in FIG. 1, the circuit selector 40 is set to the motor driving mode. In addition, in FIG. 1, a line connecting the external power source 70 and the power receiving terminal 45 is depicted as an imaginary line. That is, in FIG. 1, the external power source 70 is not connected to the charging system 2.

When the motor 30 is driven only by the first inverter 10, the controller 50 holds the neutral point switching element 35 on and sets the circuit selector 40 to the motor driving mode. By holding the neutral point switching element 35 on, the second ends of the plurality of stator coils 31 are connected to each other at the neutral point 32. At this time, the motor 30 is a closed type motor in which the second end is Y-connected. When the controller 50 stops the second inverter 20 and appropriately turns on and off the switching elements of the first inverter 10, the motor 30 is driven by the first inverter 10.

The charging system 2 can charge the battery 60 by connecting the external power source 70 to the power receiving terminal 45. In the charging system 2, the first inverter 10 or the second inverter 20 and the stator coil 31 can be used as a boost converter. Therefore, the external power source 70 may have a lower output voltage than the battery 60. The positive terminal 70*p* of the external power source 70 is connected to the connection positive electrode end 45*p* of the power receiving terminal 45, and the negative terminal 70*n* of the external power source 70 is connected to the connection negative electrode end 45*n*.

The charging system 2 can connect the positive terminal 70*p* of the external power source 70 to the stator coil 31 by using either the first lower switching element 13, the second lower switching element 23, or the neutral point switching element 35.

Temperature sensors 14, 24, and 36 are associated with the switching elements 13, 23, and 35, respectively, and the temperature of each switching element is measured. The temperature of each switching element is communicated to the controller 50. The controller 50 evaluates the accumulated stress of each switching element based on the temperature of each switching element. The accumulated stress is a value obtained by accumulating the temperature rise per unit time of each switching element. The accumulated value of the temperature rise per unit time is an index of the deterioration of the switching element. The falling temperature per unit time does not significantly contribute to the deterioration of the switching element. Therefore, the temperature drop per unit time is not taken into account for the accumulated stress.

When the proof stresses of the first lower switching element 13, the second lower switching element 23, and the neutral point switching element 35 are different, the respective accumulated stresses are multiplied by a coefficient corresponding to the proof stresses. Hereinafter, the accumulated stress of the first lower switching element 13 is referred to as a first accumulated stress, and the accumulated stress of the second lower switching element 23 is referred to as a second accumulated stress. The accumulated stress of the neutral point switching element 35 is referred to as a third accumulated stress.

When the battery 60 is charged by the external power source 70 connected to the power receiving terminal 45, the controller 50 compares the first, second, and third accumulated stresses, and guides the current of the external power source 70 to the stator coil 31 by using the switching element having the smallest accumulated stress. Therefore, the accumulated stress of the neutral point switching element 35 is reduced.

Figure 2:
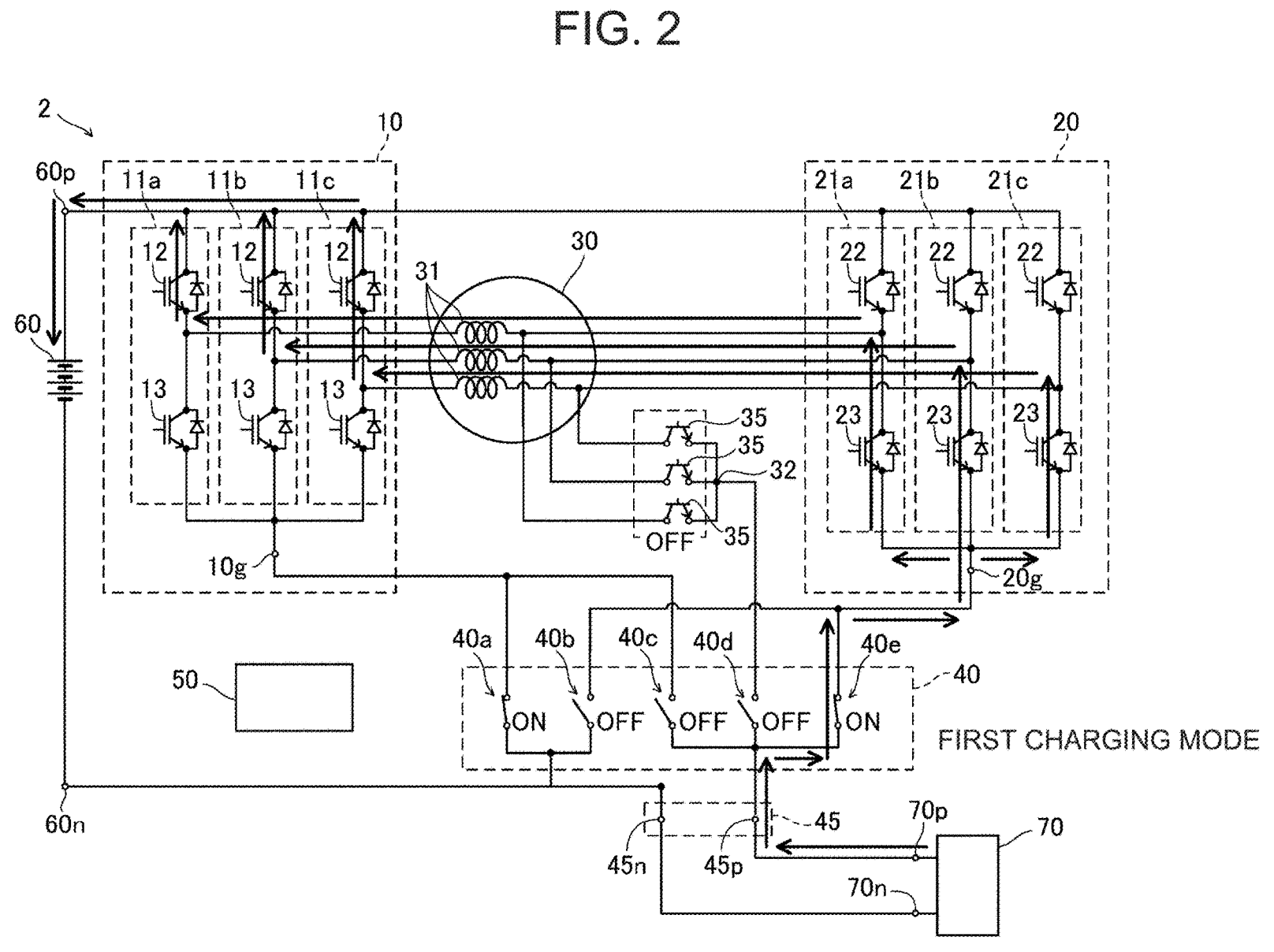

The current flow when each switching element is used will be described. When the second accumulated stress among the three accumulated stresses is the smallest, the controller 50 keeps the neutral point switching element 35 off and sets the circuit selector 40 to the first charging mode (FIG. 2). The bold arrow line in FIG. 2 indicates the current flow in the first charging mode. Note that, in FIG. 2 and subsequent figures, the temperature sensor is not shown for the sake of clarity.

The output current of the external power source 70 flows to the stator coil 31 via the power receiving terminal 45, the switch 40e of the circuit selector 40, and the second lower switching element 23. The stator coil 31 and the first lower switching element 13 have a circuit configuration equivalent to that of the boost converter. When the controller 50 appropriately turns on and off the first lower switching element 13, the voltage is boosted by the stator coil 31, and a current flows from the stator coil 31 to the battery 60 through the freewheeling diode of the first upper switching element 12. That is, the battery 60 is charged by the external power source 70.

Figure 3:
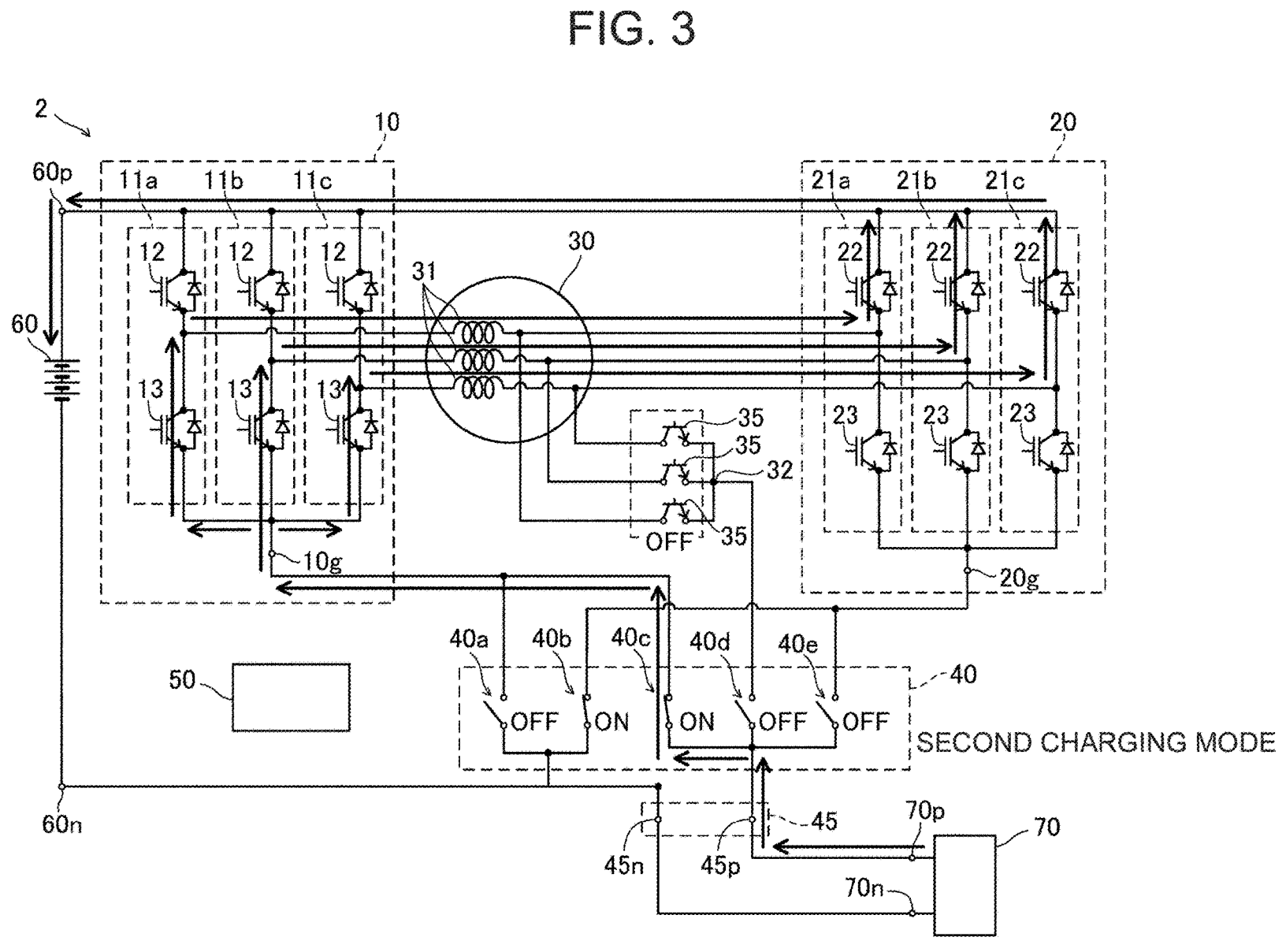

When the first accumulated stress among the three accumulated stresses is the smallest, the controller 50 keeps the neutral point switching element 35 off and sets the circuit selector 40 to the second charging mode (FIG. 3). The bold arrow line in FIG. 3 indicates the current flow in the second charging mode.

The output current of the external power source 70 flows to the stator coil 31 via the power receiving terminal 45, the switch 40c of the circuit selector 40, and the first lower switching element 13. The stator coil 31 and the second lower switching element 23 have a circuit configuration equivalent to that of the boost converter. When the controller 50 appropriately turns on and off the second lower switching element 23, the voltage is boosted by the stator coil 31, and a current flows from the stator coil 31 to the battery 60 through the freewheeling diode of the second upper switching element 22. That is, the battery 60 is charged by the external power source 70.

Figure 4:
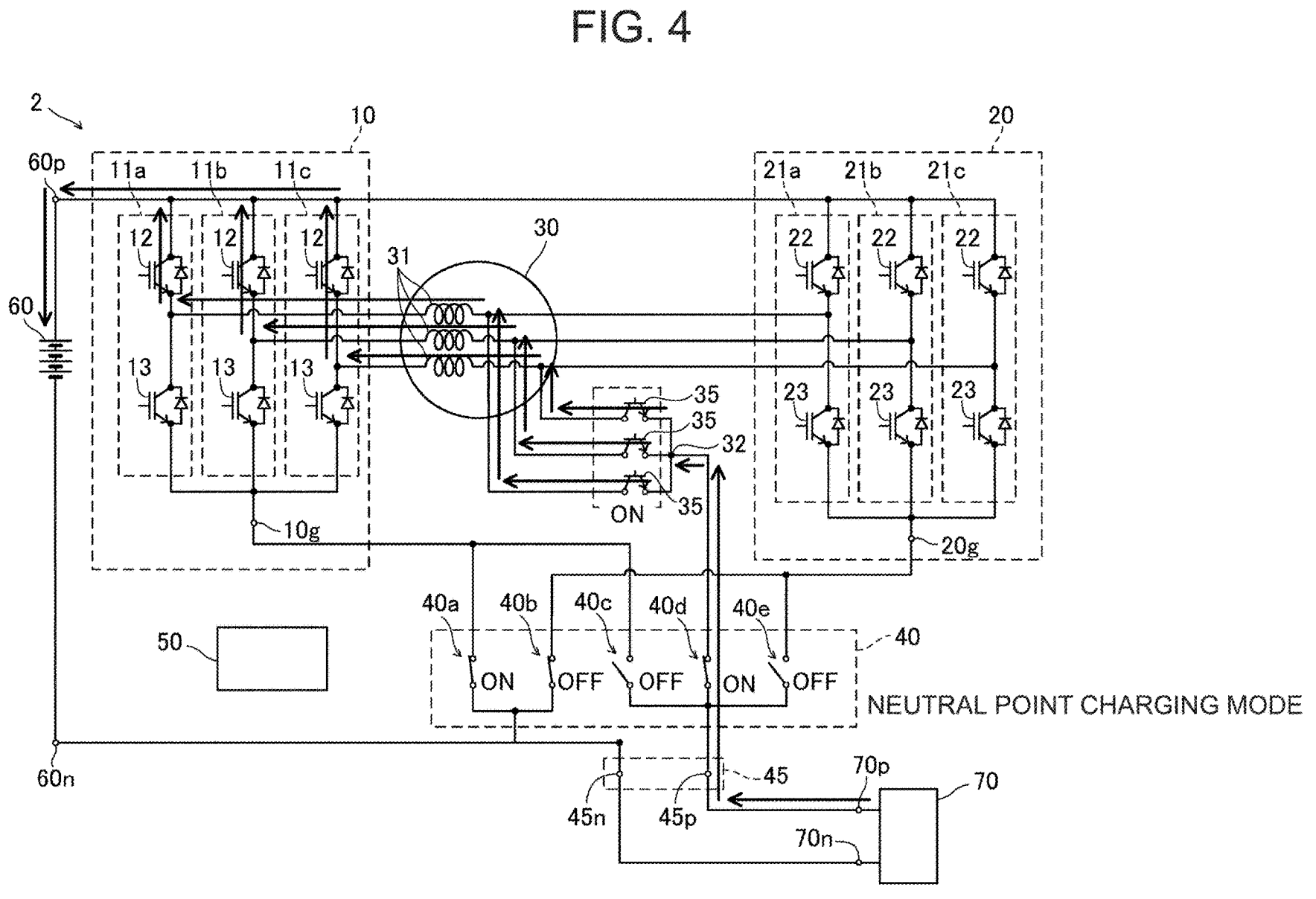

When the third accumulated stress among the three accumulated stresses is the smallest, the controller 50 holds the neutral point switching element 35 on and sets the circuit selector 40 to the neutral point charging mode (FIG. 4). The bold arrow line in FIG. 4 indicates the current flow in the neutral point charging mode.

The output current of the external power source 70 flows to the stator coil 31 via the power receiving terminal 45, the switch 40d of the circuit selector 40, and the neutral point switching element 35. As in the first charging mode, the stator coil 31 and the first lower switching element 13 have a circuit configuration equivalent to that of the boost converter. When the controller 50 appropriately turns on and off the first lower switching element 13, the voltage is boosted by the stator coil 31, and a current flows from the stator coil 31 to the battery 60 through the freewheeling diode of the first upper switching element 12. That is, the battery 60 is charged by the external power source 70.

When the first accumulated stress (that is, the accumulated stress of the first lower switching element 13) is the smallest, the controller 50 controls the circuit selector 40 so that the current of the external power source 70 flows through the first lower switching element 13 to the stator coil 31. When the second accumulated stress (that is, the accumulated stress of the second lower switching element 23) is the smallest, the controller 50 controls the circuit selector 40 so that the current of the external power source 70 flows through the second lower switching element 23 to the stator coil 31. When the third accumulated stress (that is, the accumulated stress of the neutral point switching element 35) is the smallest, the controller 50 controls the circuit selector 40 so that the current of the external power source 70 flows through the neutral point switching element 35 to the stator coil 31.

As described above, when charging the battery 60, the controller 50 controls the circuit selector 40 so that the current of the external power source 70 flows to the stator coil 31 through the switching element having the smallest accumulated stress. Therefore, the stress of the neutral point switching element 35 is reduced.

When the first accumulated stress is smallest, the controller 50 may adjust the on/off timing of each of the first lower switching elements 13 so that the current flowing through the first lower switching element 13 having the smallest accumulated stress among the accumulated stresses of each of the plurality of first lower switching elements 13 is larger than the current flowing through the first lower switching element 13 having the largest accumulated stress.

For example, the accumulated stress of the first lower switching element 13 of the first series connector 11a may be smaller than the accumulated stress of the first lower switching element 13 of the first series connector 11b, 11c. Here, the controllers 50 adjust the on/off timings of the first lower switching elements 13 so that the current flowing in the first lower switching elements 13 of the first series connector 11a is larger than the current flowing in the first lower switching elements 13 of the first series connector 11b, 11c. By such processing, the accumulated stress in the plurality of first lower switching elements 13 is also leveled. The same applies to the plurality of second lower switching elements 23 and the plurality of neutral point switching elements.

Points to be noted regarding the technique described in the embodiment will be described. The first accumulated stress may be a sum of the accumulated stresses of the plurality of first lower switching elements 13, or may be an average of the accumulated stresses of the plurality of first lower switching elements 13. The same applies to the second accumulated stress and the third accumulated stress. The same calculation formula is used in the first, second, and third accumulated stresses. The first/second/third accumulated stress may be based on the accumulated value of the temperature rise per unit time of each switching element. Typically, the first/second/third accumulated stress may be a value obtained by multiplying the accumulated value of the temperature rise per unit time of each switching element by a coefficient.

In charging employing the first charging mode, the second inverter 20 is not used. Therefore, in the first charging mode, the switch 40b may be either closed/open. In charging employing the second charging mode, the first inverter 10 is not used. Therefore, in the second charging mode, the switch 40a may be either closed/open. The second inverter 20 is not used for charging that employs a neutral point charging mode. Therefore, in the neutral point charging mode, the switch 40b may be either open/closed.

The charging system 2 can drive the motor 30 with the first inverter 10 and the second inverter 20. Therefore, the charging system 2 may be referred to as a "driving device".

The expression "keeping the switching element on" is equivalent to "closing the switching element", which means electrically connecting the devices connected to the respective ends of the switching element. The expression "keeping the switching element off" is equivalent to "opening the switching element", which means electrically disconnecting the devices connected to the respective ends of the switching element.

A filter capacitor is connected between the battery positive electrode end 60p and the battery negative electrode end 60n, but the illustration thereof is omitted. A smoothing capacitor is also connected between the connection positive electrode end 45p and the connection negative electrode end 45n, but the illustration thereof is omitted.

Although the specific examples of the present disclosure have been described in detail above, these are merely examples and do not limit the scope of claims. The techniques described in the claims include various modifications and alternations of the specific examples illustrated above. The technical elements described in the present specification or the drawings exhibit technical usefulness alone or in various combinations, and are not limited to the combinations described in the claims at the time of filing. In addition, the techniques illustrated in the present specification or drawings can achieve a plurality of objectives at the same time, and achieving one of the objectives itself has technical usefulness.

What is claimed is:

1. A charging system that charges a battery by using an external power source with an output voltage lower than an output voltage of the battery, the charging system comprising:

a motor that includes stator coils;

a first inverter connected to first ends of the stator coils;

a second inverter connected to second ends of the stator coils;

a neutral point switching element that connects the second ends of the stator coils to a neutral point;

a power receiving terminal that includes a connection positive electrode end and a connection negative electrode end to which the external power source is able to be connected, and in which the connection negative electrode end is connected to a battery negative electrode end of the battery;

a circuit selector that switches a connection relationship between the first inverter, the second inverter, the neutral point, and the power receiving terminal; and a controller, wherein the first inverter includes a first ground end, and first series connectors to which a first upper switching element and a first lower switching element are connected in series, the first series connectors being connected in parallel between a battery positive electrode end of the battery and a first ground end, the first end of each of the stator coils is connected to a center point of each of the first series connectors, the second inverter includes a second ground end, and second series connectors to which a second upper switching element and a second lower switching element are connected in series, the second series connectors being connected in parallel between the battery positive electrode end of the battery and a second ground end, the second end of each of the stator coils is connected to a center point of each of the second series connectors, any one of following modes is selectable in the circuit selector:

a motor driving mode that connects the first ground end and the second ground end to the battery negative electrode end;

a first charging mode that connects the first ground end to the battery negative electrode end and connects the second ground end to the connection positive electrode end by disconnecting from the battery negative electrode end;

a second charging mode that connects the second ground end to the battery negative electrode end and connects the first ground end to the connection positive electrode end by disconnecting from the battery negative electrode end; and a neutral point charging mode that connects the neutral point to the connection positive electrode end and connects the first ground end to the battery negative electrode end, and in a case where the motor is driven by the first inverter and the second inverter, the controller sets the circuit selector to the motor driving mode and holds the neutral point switching element to OFF, in response to the external power source being connected to the power receiving terminal, the controller compares a first accumulated stress of the first lower switching element, a second accumulated stress of the second lower switching element, and a third accumulated stress of the neutral point switching element, in a case where the second accumulated stress is smallest, the controller holds the neutral point switching element to OFF, sets the circuit selector to the first charging mode, and charges the battery by turning the first lower switching element ON and OFF, in a case where the first accumulated stress is smallest, the controller holds the neutral point switching element to OFF, sets the circuit selector to the second charging mode, and charges the battery by turning the second lower switching element ON and OFF, and in a case where the third accumulated stress is the smallest, the controller holds the neutral point switching element to ON, sets the circuit selector to the neutral point charging mode, and charges the battery by turning the first lower switching element ON and OFF.

\* \* \* \* \*